United States Patent
Yamanaka et al.

(10) Patent No.: US 8,488,964 B2
(45) Date of Patent: Jul. 16, 2013

(54) LINE CONTROL METHOD IN OPTICAL NETWORK AND OPTICAL NETWORK ITSELF

(75) Inventors: Naoaki Yamanaka, Yokohama (JP); Yutaka Arakawa, Fukuoka (JP); Kazumasa Tokuhashi, Yokohama (JP)

(73) Assignee: Keio University, Tokyo (JP)

( * ) Notice: Subject to any disclaimer, the term of this patent is extended or adjusted under 35 U.S.C. 154(b) by 394 days.

(21) Appl. No.: 13/054,876

(22) PCT Filed: Jul. 3, 2009

(86) PCT No.: PCT/JP2009/003092
§ 371 (c)(1),
(2), (4) Date: Jan. 19, 2011

(87) PCT Pub. No.: WO2010/013393
PCT Pub. Date: Feb. 4, 2010

(65) Prior Publication Data
US 2011/0123193 A1    May 26, 2011

(30) Foreign Application Priority Data
Jul. 31, 2008    (JP) .................................. 2008-198492

(51) Int. Cl.
*H04B 10/20*    (2006.01)
*H04J 14/00*    (2006.01)

(52) U.S. Cl.
USPC ................... 398/58; 398/45; 398/52; 398/63; 398/66; 398/67; 398/98; 398/100; 398/154

(58) Field of Classification Search
USPC ............... 398/45, 52, 58, 63, 66, 67, 98, 100, 398/154
See application file for complete search history.

(56) References Cited

U.S. PATENT DOCUMENTS
5,502,587 A * 3/1996 Frigo ............................... 398/58
5,523,870 A * 6/1996 Suzuki et al. .................. 398/100
(Continued)

FOREIGN PATENT DOCUMENTS
JP    A-7-177098    7/1995
JP    A-8-32523    2/1996
(Continued)

OTHER PUBLICATIONS

Nomura, T. et al., "Design of Optical Switching Module for Gigabit Ethernet Optical Switched Access Network," *IEICE Trans. Commun.*, Nov. 2006, pp. 3021-3031, vol. E89-B, No. 11.

(Continued)

Primary Examiner — Li Liu
(74) Attorney, Agent, or Firm — Oliff & Berridge, PLC

(57) ABSTRACT

In an access network using optical switches, communications between an OLT and ONUs are established without a photo-electric conversion performed at an optical switching unit. The OLT controls the downlink optical switch SW(DOWN) to sequentially select each ONU in slots arranged in a discrete manner, and transmits a Discovery Gate message. Upon receipt of the Discovery Gate message, each ONU consecutively transmits Register Request messages. The uplink optical switch SW(UP) sequentially switch signals from ONU#1 through ONU#128 in the slots arranged in a discrete manner, and outputs the signals to the OLT, Some of the Register Requests transmitted from the respective ONUs pass through the SW(UP), and reach the OLT. Based on the received Register Requests, the OLT determines the timing of transmission for the ONUS, and notifies the ONUS of the timing of transmission through a Gate message.

4 Claims, 5 Drawing Sheets

U.S. PATENT DOCUMENTS

| | | | |
|---|---|---|---|
| 8,045,857 B2 * | 10/2011 | Nomura et al. | 398/66 |
| 8,401,384 B2 * | 3/2013 | Wakayama et al. | 398/45 |
| 2006/0127087 A1 * | 6/2006 | Kasai et al. | 398/45 |
| 2006/0239285 A1 * | 10/2006 | Nomura et al. | 370/408 |
| 2007/0172236 A1 * | 7/2007 | Nomura et al. | 398/45 |
| 2009/0196606 A1 * | 8/2009 | Miyagi et al. | 398/45 |
| 2010/0021160 A1 * | 1/2010 | Wakayama et al. | 398/45 |

FOREIGN PATENT DOCUMENTS

| | | |
|---|---|---|
| JP | A-2000-295266 | 10/2000 |
| JP | A-2006-140830 | 6/2006 |
| JP | A-2007-67948 | 3/2007 |

OTHER PUBLICATIONS

International Search Report issued in International Application No. PCT/JP2009/003092 on Aug. 4, 2009 (with translation).

International Preliminary Report on Patentability issued in International Application No. PCT/JP2009/003092 on Mar. 17, 2010 (with translation).

Written Opinion of the International Searching Authority issued in International Application No. PCT/JP2009/003092 on Aug. 4, 2009 (with translation).

* cited by examiner (a)

(b)

LINE CONTROL METHOD IN OPTICAL NETWORK AND OPTICAL NETWORK ITSELF

TECHNICAL FIELD

The present invention relates to an optical access network that connects a network of a user to an accommodating station of a telecommunications carrier with optical fibers, such as FTTH (Fiber to the Home) or the like.

BACKGROUND OF THE INVENTION

In the recent FTTH system, a passive optical access network called GE-PON (Gigabit Ethernet-Passive Optical Network) is used.

FIG. 5 shows a diagram of the structure of a GE-PON.

As shown, the GE-PON comprises an OLT (Optical Line Terminal) 51, a splitter 52, and ONUs (Optical Network Units) 53. The GE-PON forms a tree structure, with the OLT 51 being at the top.

A downlink signal from the OLT 51 is reproduced at the splitter 52, and is transmitted to all the ONUs 53. Each ONU 53 refers to the LLID (Logical Link ID) in the preamble, and discards the frames other than the one directed thereto. Meanwhile, as uplink signals from the ONUs 53 are transmitted in respective periods of time allocated by the OLT 51, the uplink signals are integrated at the splitter 52 and are sent to the OLT 51 without a collision.

Initially, the ONUs 53 do not recognize the LLID, which is necessary for sifting through frames at the time of a downlink, and the timing of uplink transmission. Therefore, it is necessary to perform processes for establishing a bidirectional line called Discovery and Ranging. In those processes, a protocol called MPCP (Multi-Point Control Protocol) is used.

FIG. 6 is a chart showing a conventional discovery process in a GE-PON.

The OLT transmits a Discovery Gate message (Discovery Gate) to ONUs periodically. A LLID for broadcast (Broadcast LLID) is assigned at this point.

Upon receiving of the Discovery Gate message, each ONU waits for a random time (d) so as to avoid a collision at the time of an uplink, and then returns a Register Request message (Register Request).

The OLT determines the LLID to be assigned to the ONU having returned the Register Request message, and notifies the ONU of the LLID through a Register message (Register). The OLT also measures the distance from (or performs ranging on) the time stamp in the received Register Request message to the ONU.

The OLT then determines the timing of the next uplink (the transmission start time and transmission band of the ONU) and notifies the ONU of the timing of the next uplink through a Gate message (Gate).

Based on the received Gate message, the ONU returns a response message (Register Ack). At this point, the discovery process comes to an end.

In the above manner, when an ONU is connected to the OLT, the OLT can automatically detect the ONU, and establish a communication link by assigning a LLID to the ONU.

A GE-PON has advantages such as low costs, no power sources, and simultaneous discovery processes by broadcast, because a passive device called a splitter of a passive device is used. On the other hand, the optical power is divided at the splitter, and the divided optical power decreases as the number of the division increases. Therefore, there is a trade-off relationship between the number of subscribers that can be accommodated by one OLT and the maximum distance to a subscriber. Accordingly, there is a theoretical limit to the maximum number of subscribers accommodated by one OLT or the extension of the maximum distance. Also, since all optical signals reach all ONUS in a GE-PON, there is a limit, in principle, to on-line confidentiality.

As an active optical access system using an optical switch instead of a splitter, a GE-OSAN (Gigabit Ethernet—Optical Switched Access Network) is disclosed in a document (Non-Patent Document 1).

In a GE-OSAN, IEEE 802.3ah is used basically, and the optical switching unit includes a 1:9 splitter and an O/E (optoelectronic) converter in an optical switching device provided between the OLT and the ONUS. The optical switching unit refers to the LLIDs in the preambles of all the Ethernet (registered trade name) frames, and switches on and off an optical switch. In this manner, a discovery process is realized without broadcast.

Patent Documents 1 and 2 also disclose techniques related to GE-OSAN.

PRIOR ART

Patent Documents

Patent document 1: Japanese Patent Application Laid-Open No. 2006-140830

Patent Document 2: Japanese Patent Application Laid-Open No. 2007-67948

Non-Patent Document

Non-Patent Document 1: Takumi N., et al., "Design of Optical Switching Module for Gigabit Ethernet Optical Switched Access Network," IEICE Trans. on comm., p.p. 3021-3031, Vol. E89-B, No. 11. November 2006

SUMMARY OF THE INVENTION

Problems to be Solved by the Invention

As described above, since optical signals are distributed through a splitter in a GE-PON, the maximum number of accommodated users is 32, and the maximum distance is 20 km. As the number of accommodated persons is made larger, the number of divisions also becomes larger, and the power per person becomes lower. As a result, the distance becomes shorter. To make the distance longer, the number of accommodated persons should be a little.

It is necessary that the GE-OSAN method using an optical switch instead of a splitter perform a photoelectric conversion on each Ethernet frame and read the address [0] for the optical switch unit. Therefore, where 10 gigabits are spread, it is very difficult to electrically refer to LLIDs after photoelectric conversions are performed on all the Ethernet frames, and it is considered that the electric processing becomes the bottleneck. There is also the problem that the transparency is lost.

Consequently, the present invention provides a line control method in an optical network and an optical network itself, that can allow both an increase in the number of accommodated subscribers and an extension of the maximum distance, keeping high on-line confidentiality and is capable of high-speed transmission.

Means for Solving the Problems

To achieve the above objects, a line control method to be implemented in an optical network that is provided. The optical network includes an OLT, an optical switching device connected to the OLT, and a plurality of ONUs connected to the optical switching device, the optical switching device including: a downlink optical switch that includes an input port connected to the OLT and N output ports respectively connected to the ONUs, and outputs an optical signal output from the OLT to an output port selected from the N output ports by a control signal supplied from the OLT; and an uplink optical switch that includes N input ports respectively connected to the ONUs and an output port connected to the OLT, and outputs an optical signal input from an input port selected by a control signal supplied from the OLT to the output port, the line control method includes:

a first step in which the OLT transmits a first message sequentially to the ONUs by controlling the downlink optical switch;

a second step in which an ONU that has received the first message consecutively transmits a second message;

a third step in which the OLT controls the uplink optical switch so that optical signals transmitted from the ONUs are sequentially output to the OLT; and a fourth step in which, based on the second message received in the third step, the OLT determines timing of transmission for the ONU that has transmitted the second message, and notifies the ONU of the timing of transmission.

Also, a time from the reception of the first message by the ONU that has received the first message to a start of the consecutive transmission of the second message by the ONU that has received the first message is changed by a predetermined amount at a time, the first step through the third step are repeated a predetermined number of times, and based on the result of the first step through the third step repeatedly carried out, the timing of transmission is determined for the ONU in the fourth step.

Further, an optical network includes:

an OLT; an optical switching device connected to the OLT; and a plurality of ONUs connected to the optical switching device, wherein the optical switching device includes: a downlink optical switch that includes an input port connected to the OLT and N output ports respectively connected to the ONUs, and outputs an optical signal output from the OLT to an output port selected from the N output ports by a control signal supplied from the OLT; and an uplink optical switch that includes N input ports respectively connected to the ONUs and an output port connected to the OLT, and outputs an optical signal input from an input port selected by a control signal supplied from the OLT to the output port, the OLT performs: a process to transmit a first message sequentially to the ONUS by controlling the downlink optical switch; a process to control the uplink optical switch so that optical signals transmitted from the ONUS are sequentially output to the OLT from a point when a predetermined period of time has passed since the end of transmission of the first message; and a process to determine the timing of transmission for an ONU that has transmitted a second message, based on the second message received from the ONU, and notify the ONU of the timing of transmission, and the ONUs each perform a process to consecutively transmit the second message, upon receipt of the first message.

Furthermore, the first message contains information that specifies a period of time to elapse before an ONU that has received the first message starts consecutive transmission of the second message, and the OLT repeatedly performs a process to transmit the first message sequentially to the ONUs a predetermined number of times, using the first message in which the period of time to elapse before the start of the consecutive transmission of the second message is changed by a very small amount at a time, the OLT determining the timing of transmission for the ONU that has transmitted the second message, based on the second message received from the ONU in accordance with the repeatedly performed process.

Advantages of the Invention

According to the present invention, an access network with high scalability can be formed with optical switches. That is, by virtue of the use of optical switches, there is no theoretical optical power loss at dividing points, and accordingly, the maximum distance can be longer without any loss of the optical power even when the number of subscribers increases.

Also, there is no need to electrically refer to the LLIDs after photoelectric conversions at the optical switching unit. Accordingly, the bottleneck due to electrical processing can be eliminated, and high-speed transmission can be performed.

Further, as the optical switches are controlled by control signals supplied from the OLT independently of data, the Ethernet frames of all the data can be transferred in a transparent manner.

Furthermore, according to the present invention, as the first message is repeatedly transmitted changing the period of time to elapse a small amount before consecutive transmission of the second message is started, the timing of uplink transmission can be recognized with high precision, and highly reliable transmission with low loss can be performed.

BEST MODE FOR CARRYING OUT THE INVENTION

Figure 1:
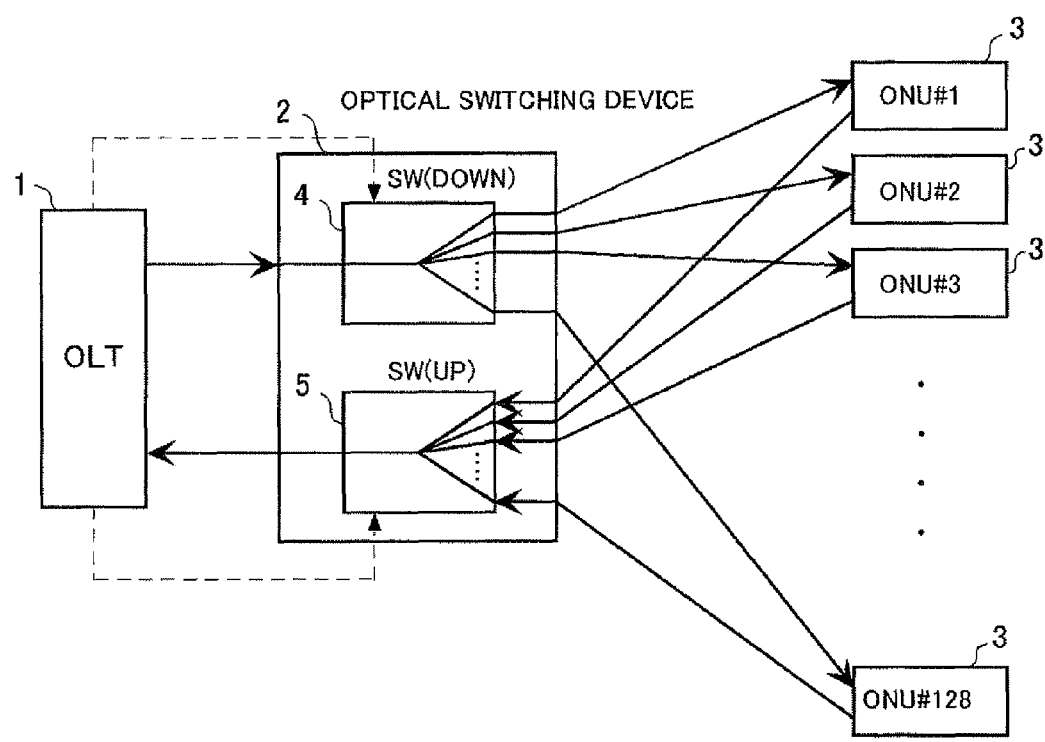
FIG. 1 is a functional block diagram showing the structure of an embodiment of an optical network of the present invention.

FIG. 1 is a block diagram showing a structure of an embodiment of an optical network according to the present invention.

This diagram shows an optical line terminal 1 (OLT: Optical Line Terminal), an optical switching device 2, and optical network units 3 (ONUs: Optical Network Units) connected in parallel to the optical switching device 2. As shown in the diagram, this optical network is a tree structure in which the OLT 1 is located at its top and the ONUs 3 are connected to the OLT 1 on its downstream side. An active type optical switching device 2 is placed between the OLT 1 and the ONUs 3. The optical fibers connecting those components have compatibility with the above described GE-PON, and downlink wavelength is 1490 nm, uplink wavelength is 1310 nm. As the maximum distance may be extended, the optical switching device 2 is probably installed within the facilities of the carriers, and the OLT 1 and the optical switching device 2 are synchronized.

The optical switching device 2 has an optical switch (SW (DOWN)) 4 for the downlink direction (OLT 1→ONUs 3), and an optical switch (SW(UP)) 5 for the uplink direction (ONUS 3→OLT 1). The downlink optical switch 4 has one input port connected to the OLT 1, and N output ports. In this embodiment, N is 128, so the 128 ONUs 3 (ONU#1 through ONU#128) can be connected to the output ports. The uplink optical switch 5 has N (=128) input ports to which the ONUs 3 (ONU#1 through ONU#128) can be respectively connected, and one output port connected to the OLT 1.

The optical switches 4 and 5 are controlled by control signals supplied from the OLT 1 independently of data, as shown via dashed lines in FIG. 1. An optical signal transmitted from the OLT 1 is input to the input port of the downlink optical switch 4, and is output from an output port selected by a control signal supplied from the OLT 1. The optical signal is then transmitted to the ONU 3 connected to the selected output port. An optical signal transmitted from an ONU 3 is supplied to the corresponding input port of the uplink optical switch 5. The signal supplied to an input port selected by a control signal supplied from the OLT 1 is output to the output port, and is input to the OLT 1.

In the optical network of the present invention that utilizes optical switches, broadcast cannot be used unlike in a GE-PON that utilizes splitters. Therefore, in the present invention, discovery is realized without broadcast by periodically setting communication channels and recognizing the communication channels through successive frame transmission from ONUs.

In the following, the line control method according to the present invention is described in detail.

In the optical network according to the present invention, band frequencies are assigned within a fixed time duration (the minimum assignment time being 512 [ns], for example), to simplify the control operation. Hereinafter, the minimum assignment time will be referred to as a slot.

1) Establishment of Communication Channels

In the present invention, communication channels are formed between the OLT and the ONUS by periodically switching the optical switches to an optical port. A communication channel means a period of time in which an optical switch is invariably switched to a predetermined optical port, and can be used without a reservation.

Figure 2:
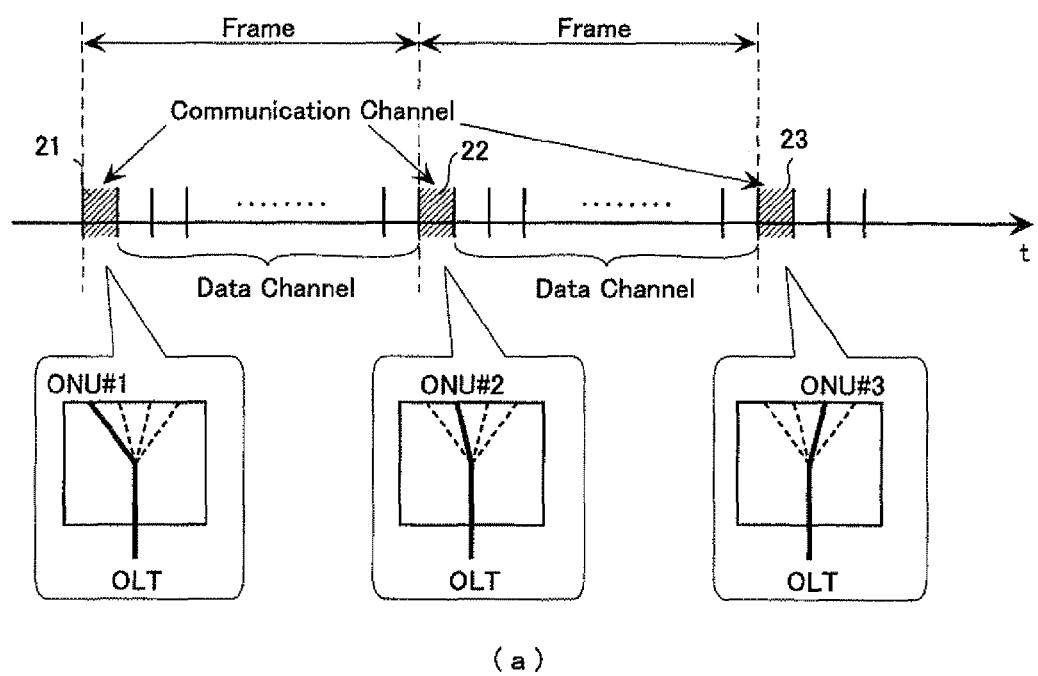
FIG. 2(a) is a diagram showing an example of discrete arrangement of communication channels.
FIG. 2(b) is a diagram showing an example of group arrangement of communication channels.
Figure 2:
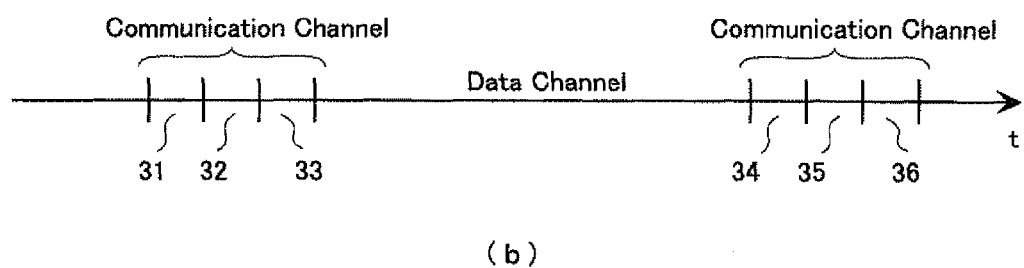

FIG. 2 are diagrams for explaining communication channels. FIG. 2(a) shows a case where communication channels are discrete arrangement, and FIG. 2(b) shows a case where communication channels for the ONUs are group arrangement.

As shown in FIG. 2(a), in case of the discrete arrangement, communication channels are periodically arranged on a time axis, and ONU#1 through ONU#128 are sequentially switched. The size of each communication channel is equivalent to one slot. Between each two communication channels, there are data channels of 128 slots shared by 128 subscribers, and those channels are assigned to the respective ONUs by the OLT 1, based on requests from the ONUs 3. The 129 slots formed by the one slot of the communication channel and the 128 slots of the data channels are defined as one frame. As a result, a communication channel is assigned to each ONU once in 16,512 slots (8.5 ms).

In case where the example shown in the drawing involves downlink communication channels, the slot denoted as 21 in the drawing is controlled so that the above described downlink optical switch 4 selects the output port connected to ONU#1, and the selected output port is connected to the input port connected to the OLT 1. In the slot denoted as 22, the output port connected to ONU#2 is selected and is connected to the OLT 1. In the slot denoted by 23, the output port connected to ONU#3 is selected and is connected to the OLT 1. In case where the example illustrated in the drawing involves uplink communication channels, in the slot denoted as 21 in the drawing, the uplink optical switch 5 selects the input port connected to ONU#1, and the selected input port is connected to the output port connected to the OLT 1. In the slot denoted as 22, the input port connected to ONU#2 is selected and is connected to the OLT 1. In the slot denoted as 23, the input port connected to ONU#3 is selected and is connected to the OLT 1.

FIG. 2(b) is a diagram showing an example of the grouped arrangement. As shown in the diagram, in the grouped arrangement, several slots forming communication channels are consecutively set between data channels. For example, in slots 31, 32, and 33, ONU#1, ONU#2, and ONU#3 are consecutively selected at an optical switch, and in the following sets of slots 34, 35, and 36, ONU#4, ONU#5, and ONU#6 are consecutively selected, with a data channel being interposed between the slots 31, 32, and 33, and the slots 34, 35, and 36. Alternatively, the communication channels corresponding to all the ONUS 3 (ONU#1 through ONU#128) may be consecutively placed.

As described above, in the present invention, slots are assigned periodically to the respective ports of the optical switches in both the downlink direction and the uplink direction, so as to establish the communication channels.

2) Recognizing of Communication Channels at ONUs a) OLT 1 to ONUs 3

The OLT 1 controls the optical switching device 2 with the above described control signals, using some protocol in advance. Accordingly, the OLT 1 recognizes the communication channel corresponding to a desired ONU 3. In other words, the OLT 1 sends a Discovery Gate message (Discovery Gate) to each ONU 3 on a regular basis, and the timing is set as a communication channel in the optical switching device 2. As a result, transfers from the OLT 1 to the ONUs 3 can be performed without reference to a LLID.

b) ONUs 3 to OLT 1

As for the uplinks, each ONU 3 in the initial state does not know the position of the corresponding communication channel, including the distance from the OLT. Therefore, the ONU 3 consecutively transmits a Register Request message (Register Request). From the time stamp in the received Register Request message, the OLT determines the distance to the ONU 3 and the positions of the ONU 3 and the communication channel. The OLT then sends the ONU 3 a Gate message containing the information about the distance and the positions.

Figure 3:
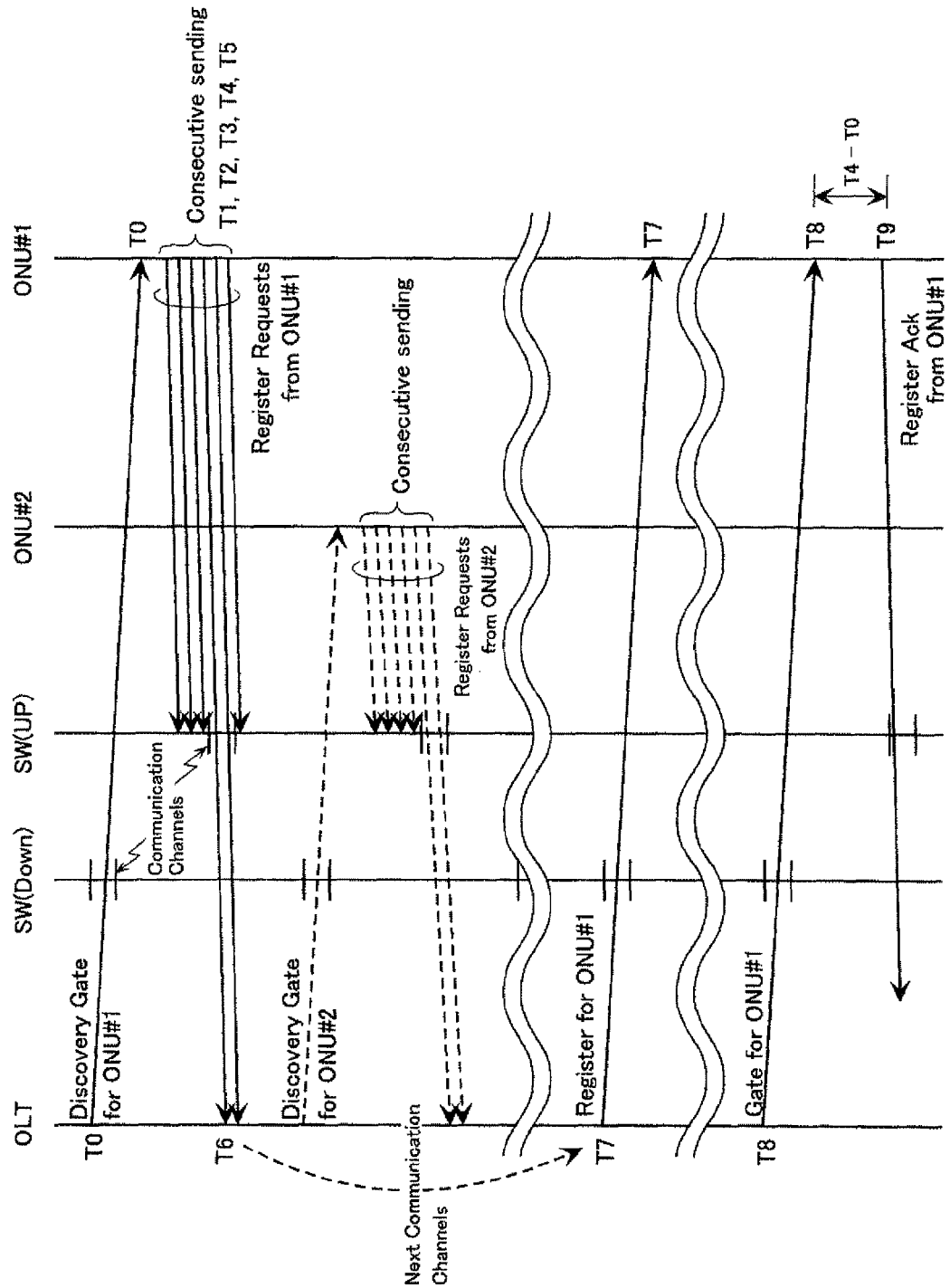
FIG. 3 is a diagram for explaining a first embodiment of a line control method of the present invention.

Referring now to FIG. 3, the discovery procedures for establishing communications between the OLT 1 and the ONUs 3 in this optical network of the present invention will be explained hereinafter. It should be noted that the communication channels of the 128 subscribers (ONU#1 through ONU#128) herein are arranged in a discrete manner as shown in FIG. 2(a).

The OLT 1 periodically transmits a Discovery Gate message (Discovery Gate) in conformity with the downlink communication channels. That is, the downlink switch SW(Down) 4 is sequentially switched from ONU#1 through ONU#128 with the control signal from the OLT 1 in the slots of the downlink communication channels, and the Discovery Gate messages are distributed to the respective ONUs.

Upon receipt of a Discovery Gate message, each ONU 3 immediately starts consecutive transmission of Register Request messages (Register Requests). In the example illustrated in the drawing, having received the Discovery Gate message at time T0, ONU#1 consecutively transmits Register Request messages at time T1, time T2, time T3, Time T4, time T5, . . . . It should be noted that the consecutive transmission is continued until a Register message is received from the OLT 1.

The Register Request messages transmitted from ONU#X (X=1 through 128) are discarded if the uplink optical switch 5 in the optical switching device 2 is directed to an optical port other than ONU#X. The Register Request messages are sent to the OLT 1 through the optical switch 5 if they are within the section of the uplink communication channel of ONU#X. In other words, the uplink switch SW(UP) 5 functions like a filter. In the example shown in the drawing, some of the Register Request messages transmitted from ONU#1 reach the OLT 1 at time T6.

The differences between the time positions of the slots forming the downlink communication channels and the time positions of the slots forming the uplink communication channels are determined based on the delay time in transmission to the ONU 3 located in the position furthest (40 km away) from the OLT 1 in accordance with the standards.

Upon receipt of a Register Request message, the OLT 1 determines a LLID to be assigned to the GNU, and notifies the ONU 3 of the LLID through a Register message, using the next downlink communication channel. Also, from the time stamp in the received Register Request message, the OLT 1 calculates the position of the uplink communication channel of the ONU 3, and returns a Gate message including Grant Start Time (the transmission start time) to the ONU 3, using the communication channel after the next. When receiving two or more Register Request messages, the OLT 1 employs the first one of the Register Request messages.

In FIG. 3, the Register Request messages that reach the OLT 1 at time T6 are the Register Request messages that are transmitted from ONU#1 at time T4. Here, the OLT 1 determines a LLID to be assigned to ONU#1, and notifies ONU#1 of the LLID through a Register message, using the next communication channel (T7). Based on the time stamp (time T4) contained in the received Register Request message, the OLT 1 measures the round-trip time RTT from the OLT to the ONU (ONU#1) (T4-T0 in this case). Based on the round-trip time RTT, the OLT 1 determines the transmission start time T9 (=T7+(T4-T0)), and transmits the result through a Gate message, using the communication channel of the ONU (ONU#1) after the next (T8).

Upon receipt of the Gate message, the ONU returns a response message (Register Ack) after standing by until the transmission start time T9 specified in the message. The Register Ack message is transmitted at the time designated by the OLT 1, passes through the uplink communication channel in the uplink optical switch, and reaches the OLT 1, without consecutive transmission.

In this manner, a bidirectional communication between the OLT 1 and an unregistered ONU 3 is established.

In the above described embodiments, the position of a communication channel (the start position of a slot) is recognized, based on the minimum transfer intervals of Ethernet frames or the transmission intervals (60 ns, for example) in consecutive transmission of Register Request messages.

Figure 4:
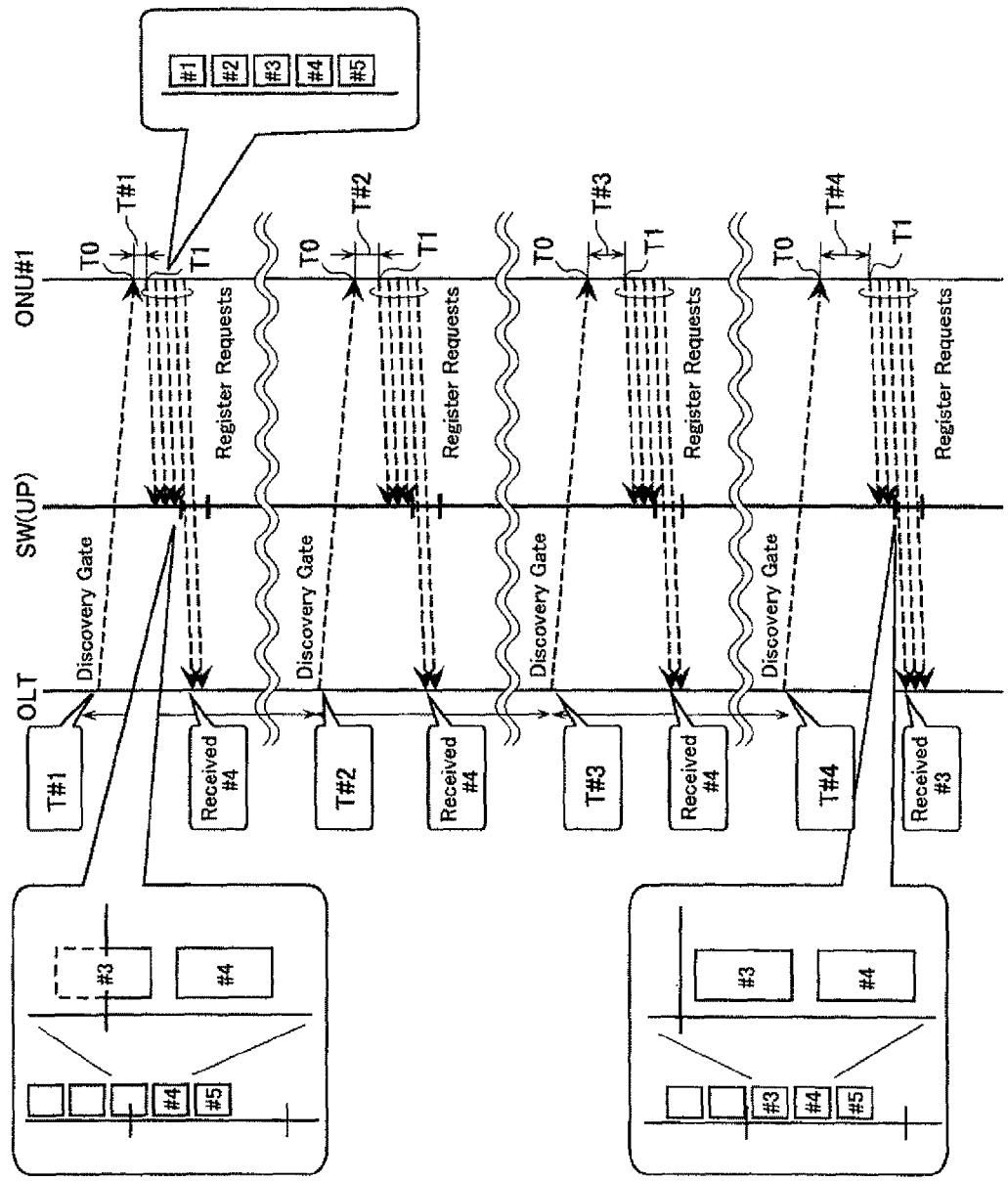
FIG. 4 is a diagram for explaining a second embodiment of a line control method of the present invention by which the positions of communication channels can be more accurately recognized.
Figure 5:
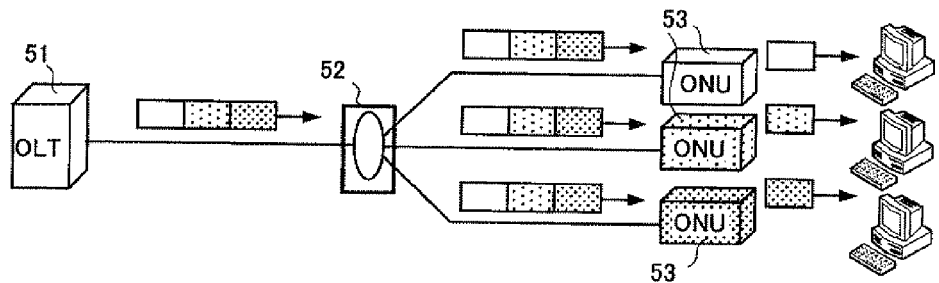
FIG. 5 is a diagram showing the structure of a GE-PON.
Figure 6:
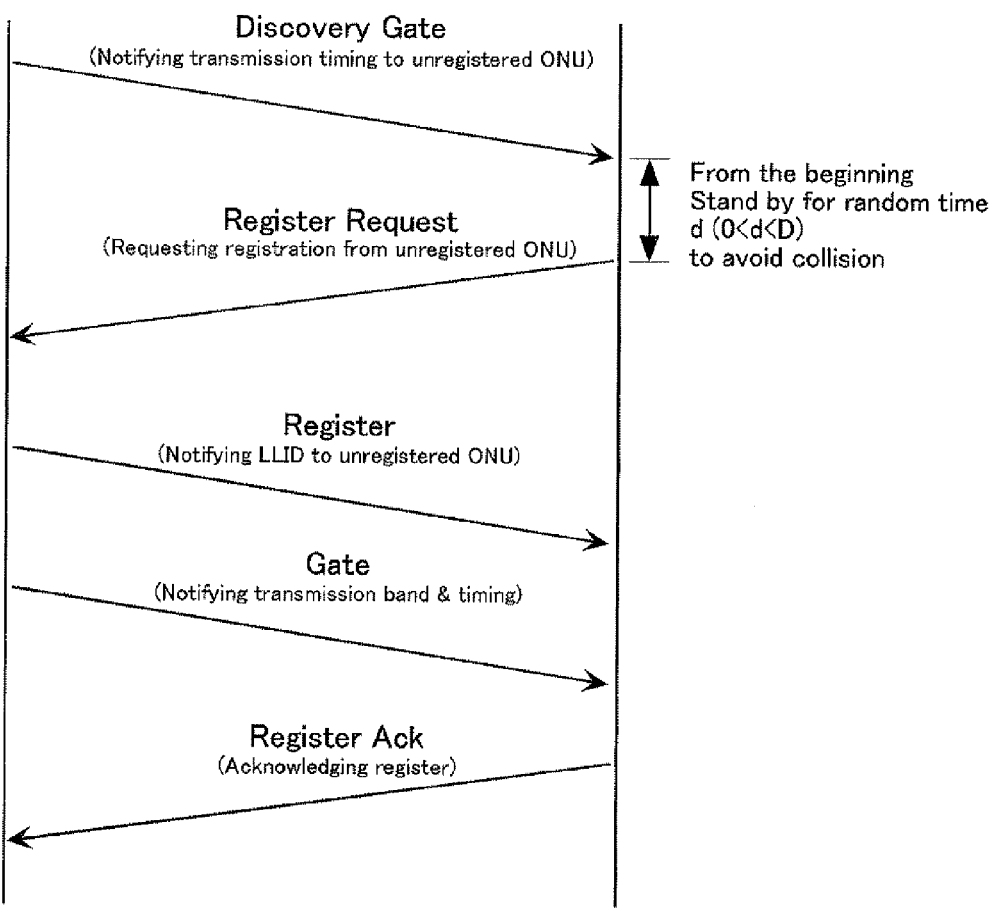
FIG. 6 is a chart for explaining a conventional discovery process in a GE-PON.

Referring now to FIG. 4, a second embodiment of a line control method of the present invention by which the position of each communication channel can be more accurately recognized is described.

In this embodiment, a Discovery Gate message transmitted from the OLT 1 to each GNU 3 contains information that specifies the time from the reception of a Discovery Gate message by an ONU 3 to the timing to start the consecutive transmission of Register Request messages. The OLT 1 changes the timing to start the transmission of the Register Request messages little by little, and performs the discovery process several times.

The information that specifies the time to start the consecutive transmission of the Register Request messages is expressed as "a x (iteration count of the discovery process–1)", where "a" represents a fine adjustment parameter (10 ns, for example).

1) Using a downlink communication channel, the OLT 1 first sends each ONU 3 a Discovery Gate message containing information that instructs each ONU 3 to start the consecutive transmission of Register Request messages in time T#1 since the ONUs 3 receive the Discovery Gate message.

2) Upon receipt of the Discovery Gate message, each ONU 3 consecutively transmits Register Request messages after T#1 time has elapsed.

3) One of the consecutively transmitted Register Request messages passes through the optical switch 5 in the uplink communication channel, and reaches the OLT 1. In the example shown in the drawing, the fourth transmitted Register Request message (#4) reaches the OLT 1.

4) The above procedures 1) through 3) are repeated only a predetermined number of times, while the set time from the reception of a Discovery Gate message to the start of consecutive transmission of Register Request messages is changed.

In the example shown in the drawing, the OLT 1 transmits each ONU 3 a Discovery Gate message containing the information that instructs each ONU 3 to start the consecutive transmission of Register Request messages after T#2 time has elapsed. Upon receipt of the Discovery Gate message, each ONU 3 consecutively transmits Register Request messages after the designated T#2 time has elapsed. The fourth transmitted message among the Register Request messages reaches the OLT 1. In response to that, the OLT 1 transmits a Register message in the same manner as above. Upon receipt of the Register message, each ONU 3 stops the consecutive transmission of Register Request messages.

The OLT 1 then transmits a Discovery Gate message that designates T#3 time. Among the Register Request messages in response to the Discovery Gate message, the fourth one reaches the OLT 1 in the same manner as described above. Next, a Discovery Gate message that designates time T#4 is then transmitted. Among the Register Request messages sent in response to the Discovery Gate message, the fourth one reaches the OLT 1.

In this manner, the OLT 1 can recognize the positions of the uplink communication channels with the resolution corresponding to the amount of change α in the shift in the timing to start transmission (T#1, T#2, T#3, T#4, . . . ).

5) Based on the positions of the communication channels recognized in the procedure 4), the OLT 1 determines the timing of transmission for the ONU in the same manner as above, and transmits a Gate message containing the timing of transmission to the ONU, using the next communication channel of the ONU. In this manner, a bidirectional communication between the OLT 1 and each ONU 3 is established.

As described above, Discovery Gate messages containing slightly varied timings for responses from the ONUs 3 are repeatedly transmitted, and Register Request messages are repeatedly received. In this manner, the start time of each communication channel can be recognized with high precision. For example, in a case where the Ethernet frame transmission intervals are 60 ns, and α is 10 ns, the timing of transmission can be determined to an accuracy of 10 ns by repeating the discovery process five times at a maximum.

In the above description, the communication channels of 128 subscribers (ONU#1 through ONU#128) are arranged in a discrete manner. However, the present invention can also be applicable to a grouped arrangement case where the communication channels of several subscribers are collectively arranged as shown in FIG. 2(b), and for example, a case where the communication channels of the 128 subscribers are successively arranged, without any data channel interposed in between.

Explanation of Reference Numerals
1: Optical Line Unit (OLT)
2: switching device
3: Optical Network Unit (ONU)
4: downlink switch (SW(DOWN))
5: uplink switch (SW(UP))

The invention claimed is:

1. A line control method to be implemented in an optical network having an optical line unit (OLT), an optical switching device connected to the OLT, and a plurality of optical network unit (ONU) connected to the optical switching device,
the optical switching device having: a downlink optical switch that includes an input port connected to the OLT and N output ports respectively connected to the ONUs, and outputs a signal from the OLT to an output port selected from the N output ports by a control signal supplied from the OLT; and an uplink optical switch that comprises N input ports respectively connected to the ONUs and an output port connected to the OLT, and outputs an input signal from an input port selected by a control signal supplied from the OLT to the output port,
the line control method comprising:
a first step in which the OLT transmits a first message sequentially to the ONUs by controlling the downlink optical switch;
a second step in which an ONUS that have received the first message consecutively transmit second messages;
a third step in which the OLT controls the uplink optical switch so that optical signals transmitted from the ONUS are sequentially output to the OLT; and
a fourth step in which, based on the second messages received in the third step, the OLT determines timing of transmission for the ONU that has transmitted the second message, and notifies the ONU of the timing of transmission.

2. The line control method according to claim 1, wherein
a time from reception of the first message by the ONU that has received the first message to a start of consecutive transmission of the second message by the ONU that has received the first message is changed by a predetermined amount at a time,
the first step through the third step are repeated a predetermined number of times, and
based on a result of the first step through the third step repeatedly carried out, the timing of transmission is determined for the ONU in the fourth step.

3. An optical network comprising:
an OLT; an optical switching device connected to the OLT; and a plurality of ONU connected to the optical switching device,
wherein
the optical switching device comprises: a downlink optical switch that includes an input port connected to the OLT and N output ports respectively connected to the ONUS, and outputs a signal from the OLT to an output port selected from the N output ports by a control signal supplied from the OLT; and an uplink optical switch that includes N input ports respectively connected to the ONUs and an output port connected to the OLT, and outputs an input signal from an input port selected by a control signal supplied from the OLT to the output port,
the OLT performs: a process to transmit a first message sequentially to the ONUs by controlling the downlink optical switch; a process to control the uplink optical switch so that optical signals transmitted from the ONUs are sequentially output to the OLT from a point when a predetermined period of time has passed since an end of transmission of the first message; and a process to determine timing of transmission for an ONU that has transmitted a second message, based on the second message received from the ONU, and notify the ONU of the timing of transmission, and
the ONUS each perform a process to consecutively transmit the second message, upon receipt of the first message.

4. The optical network according to claim 3, wherein
the first message contains information that specifies a period of time to elapse before an ONU that has received the first message starts consecutive transmission of the second message, and
the OLT repeatedly performs a process to transmit the first message sequentially to the ONUs a predetermined number of times, using the first message in which the period of time to elapse before the start of the consecutive transmission of the second message is changed by a very small amount at a time, the OLT determining timing of transmission for the ONU that has transmitted the second message, based on the second message received from the ONU in accordance with the repeatedly performed process.

* * * * *